(12) United States Patent
Hua et al.

(10) Patent No.: US 12,422,999 B2
(45) Date of Patent: Sep. 23, 2025

(54) SOLID-STATE DISKS WEAR LEVELING WITH PREDICTIVE MIGRATION OF DATA DEVICES IN A RAID CONTAINER SYSTEM

(71) Applicant: Dell Products L.P., Hopkinton, MA (US)

(72) Inventors: Kuolin Hua, Natick, MA (US); Kunxiu Gao, Boxborough, MA (US); Malak Alshawabkeh, Franklin, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/502,147

(22) Filed: Nov. 6, 2023

(65) Prior Publication Data

US 2025/0147671 A1    May 8, 2025

(51) Int. Cl.
    *G06F 3/06*    (2006.01)
(52) U.S. Cl.
    CPC .......... *G06F 3/0616* (2013.01); *G06F 3/0644* (2013.01); *G06F 3/0688* (2013.01)
(58) Field of Classification Search
    CPC ..... G06F 3/0616; G06F 3/0644; G06F 3/0688
    See application file for complete search history.

(56) References Cited

U.S. PATENT DOCUMENTS

| | | | |
|---|---|---|---|
| 9,134,917 B2* | 9/2015 | Kimmel | G06F 3/0643 |
| 2012/0084505 A1* | 4/2012 | Colgrove | G06F 11/3055 |
| | | | 711/E12.001 |
| 2017/0285972 A1* | 10/2017 | Dalmatov | G06F 3/0616 |
| 2022/0283711 A1* | 9/2022 | Klein | G06F 3/0679 |

FOREIGN PATENT DOCUMENTS

CN    111966569 A    * 11/2020

* cited by examiner

*Primary Examiner* — Hosain T Alam
*Assistant Examiner* — Subir Kumar Chowdhury
(74) *Attorney, Agent, or Firm* — Anderson Gorecki LLP

(57) ABSTRACT

A container system facilitates selective migrations of data from high-wear inducing data devices to spare data devices to promote SSD wear levelling. Storage capacity is configured into same-size cells with each container having the same number of cells as RAID width W. The cells are distributed over W SSDs. The containers are subdivided into equal-size data devices, each distributed over the same set of W SSDs as its associated container. Candidate migration source-target pairs are selected using heuristics guided by a prediction model that correlates disk wear rate with total writes of existing workloads. Wear rate predictions are computed using a weighted sum of write rates of all data devices on a disk. Wear rate predictions for candidate migration pairs are computed inclusive of additional wear caused by data migration to select a migration plan.

17 Claims, 8 Drawing Sheets

| cell/disk | 1 | 2 | 3 | 4 | 5 |   | 6 | 7 | 8 | 9 | 10 |   | 11 | 12 | 13 | 14 | 15 | 16 |
|---|---|---|---|---|---|---|---|---|---|---|---|---|---|---|---|---|---|---|
| 1 | A | B | C | D | E |   | F | F | F | F | F |   | K | K | K | K | K | P |
| 2 | B | C | D | E | A |   | G | G | G | G | G |   | L | L | L | L | P | L |
| 3 | C | D | E | A | B |   | H | H | H | H | H |   | M | M | M | P | M | M |
| 4 | D | E | A | B | C |   | I | I | I | I | I |   | N | N | P | N | N | N |
| 5 | E | A | B | C | D |   | J | J | J | J | J |   | O | P | O | O | O | O |

Figure 3

| dev/disk:cell | 1:1 | 2:5 | 3:4 | 4:3 | 5:2 |
|---|---|---|---|---|---|
| 1 | A1 | A1 | A1 | A1 | A1 |
| * | * | * | * | * | * |
| z | Az | Az | Az | Az | Az |

| dev/disk:cell | 1:5 | 2:4 | 3:3 | 4:2 | 5:1 |
|---|---|---|---|---|---|
| * | E1 | E1 | E1 | E1 | E1 |
| * | * | * | * | * | * |
| * | Ez | Ez | Ez | Ez | Ez |

| dev/disk:cell | 6:1 | 7:1 | 8:1 | 9:1 | 10:1 |
|---|---|---|---|---|---|
| 1 | F1 | F1 | F1 | F1 | F1 |
| * | * | * | * | * | * |
| z | Fz | Fz | Fz | Fz | Fz |

| dev/disk:cell | 6:5 | 7:5 | 8:5 | 9:5 | 10:5 |
|---|---|---|---|---|---|
| * | J1 | J1 | J1 | J1 | J1 |
| * | * | * | * | * | * |
| * | Jz | Jz | Jz | Jz | Jz |

| dev/disk:cell | 11:1 | 12:1 | 13:1 | 14:1 | 15:1 |
|---|---|---|---|---|---|
| 1 | K1 | K1 | K1 | K1 | K1 |
| * | * | * | * | * | * |
| z | Kz | Kz | Kz | Kz | Kz |

| dev/disk:cell | 12:5 | 13:4 | 14:3 | 15:2 | 16:1 |
|---|---|---|---|---|---|
| * | P1 | P1 | P1 | P1 | P1 |
| * | * | * | * | * | * |
| * | Pz | Pz | Pz | Pz | Pz |

Figure 4

| cell/disk | 1 | 2 | 3 | 4 | 5 | | 6 | 7 | 8 | 9 | 10 | | 11 | 12 | 13 | 14 | 15 | 16 |
|---|---|---|---|---|---|---|---|---|---|---|---|---|---|---|---|---|---|---|
| 1 | A | B | C | D | E | | F | F | F | F | F | | K | K | K | K | K | P |
| 2 | B | C | D | E | A | | G | G | G | G | G | | L | L | L | L | P | L |
| 3 | C | D | E | A | B | | H | H | H | H | H | | M | M | M | P | M | M |
| 4 | D | E | A | B | C | | I | I | I | I | I | | N | N | P | N | N | N |
| 5 | E | A | B | C | D | | J | J | J | J | J | | O | P | O | O | O | O |

Figure 7

SOLID-STATE DISKS WEAR LEVELING WITH PREDICTIVE MIGRATION OF DATA DEVICES IN A RAID CONTAINER SYSTEM

TECHNICAL FIELD

The subject matter of this disclosure is generally related to electronic data storage.

BACKGROUND

Institutional level electronic data storage systems such as storage area networks (SANs), network-attached storage (NAS), and software-defined and disaggregated variants thereof are typically used to maintain data associated with an organization's email, accounting, inventory control, and manufacturing, for example, and without limitation. Such data storage systems may maintain data on arrays of solid-state drives (SSDs) because SSDs have lower access latency than hard disk drives (HDDs). SSDs are non-volatile storage media based on electrically erasable programmable read-only memory (EEPROM) technology such as NAND and NOR flash memory. A well-known limitation of SSDs is that their service life is limited in terms of program/erase (P/E) cycles. In order to store data, an SSD writes the data to blocks of a page of memory by programming memory cells associated with those blocks. In order to overwrite or change existing data, the SSD writes new data to blocks of a new page and marks the existing data blocks on the old page as stale. Eventually, the old page is recycled by erasing the associated memory cells. SSD memory cells are expected to fail after being subjected to a certain number of P/E cycles. SSD expected service life from new may be expressed as an endurance rating in units of drive writes per day (DWPD) that can be sustained for a certain time period such as 5 years. At least some SSDs are configured to provide an indication of their remaining wear-level, e.g., in terms of terabytes written or percentage of writes remaining or used.

SSDs are commercially available in a variety of different types that are distinguished from each other in terms of speed (access latency), cost per bit of storage capacity, and endurance rating. For example, single-level cell (SLC) SSDs that store only one bit per memory cell have relatively high speed, high cost, and high endurance relative to other types of SSDs. Quad-level cell (QLC) SSDs store four bits per memory cell. Penta-level cell (PLC) SSDs store five bits per cell. Consequently, QLCs and PLCs have lower cost per bit of storage capacity than SLCs. QLCs and PLCs also exhibit relatively good speed, but they have relatively low endurance in comparison with SLCs and other types of SSDs. If uneven wear levels of QLCs and PLCs in a disk array are left unchecked, there is a risk that an excessive number of SSDs will approach 100% wear and need to be replaced, thereby negating the cost advantage of the QLCs and PLCs relative to higher endurance SSD types.

SUMMARY

In accordance with some embodiments, a method comprises: configuring storage capacity of an array of solid-state drives (SSDs) by: creating equal-size redundant array of independent disk (RAID) containers that each have W same-size cells corresponding to a RAID width W; distributing the W cells per container over W SSDs; subdividing each of the containers into equal-size data devices; and distributing each data device over W SSDs; and computing and implementing SSD wear leveling by migrating data from high-wear rate data devices on high-wear level SSDs to empty data devices on SSDs that are not high-wear level.

In accordance with some implementations, an apparatus comprises: a data storage node in which storage capacity of an array of solid-state drives (SSDs) is characterized by equal-size redundant array of independent disk (RAID) containers that each have W same-size cells corresponding to a RAID width W, the W cells per container distributed over W SSDs, each of the containers subdivided into equal-size data devices, and each data device distributed over W SSDs; and an SSD wear control program configured to compute and implement SSD wear leveling by causing data to migrate from high-wear rate data devices on high-wear level SSDs to empty data devices on SSDs that are not high-wear level.

In accordance with some implementations, a non-transitory computer-readable storage medium stores instructions that when executed by one or more computers cause the computers to perform a method comprising: configuring storage capacity of an array of solid-state drives (SSDs) by: creating equal-size redundant array of independent disk (RAID) containers that each have W same-size cells corresponding to a RAID width W; distributing the W cells per container over W SSDs; subdividing each of the containers into equal-size data devices; and distributing each data device over W SSDs; and computing and implementing SSD wear leveling by migrating data from high-wear rate data devices on high-wear level SSDs to empty data devices on SSDs that are not high-wear level.

The summary does not limit the scope of the claims or the disclosure. All examples, embodiments, aspects, implementations, and features can be combined in any technically possible way and the method and process steps may be performed in any order.

BRIEF DESCRIPTION OF THE FIGURES

FIGS. 2, 3, and 4 illustrate the container system.

FIG. 7 illustrates data migration to promote wear leveling.

Various features and advantages will become more apparent from the following detailed description of exemplary embodiments in conjunction with the drawings.

DETAILED DESCRIPTION

Some aspects, features, and implementations described herein may include computer devices, components, and computer-implemented steps or processes. It will be apparent to those of ordinary skill in the art that the computer-implemented steps or processes may be stored as computer-executable instructions on a non-transitory computer-readable medium. Furthermore, it will be understood by those of ordinary skill in the art that the computer-executable instructions may be executed on a variety of tangible processor devices. For ease of exposition, not every step, process, or element is necessarily described herein as part of a computer system. Those of ordinary skill in the art will recognize steps, processes, and elements that may have a corresponding computer system or software component. Such computer systems and software components are therefore enabled by describing their corresponding steps, processes, or elements, and are within the scope of the disclosure.

The terminology used in this disclosure is intended to be interpreted broadly within the limits of subject matter eligibility. The terms "disk" and "drive" are used interchangeably and are not intended to indicate any specific type of storage media. The terms "logical" and "virtual" are used to refer to features that are abstractions of other features, e.g., and without limitation abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof.

Figure 1:
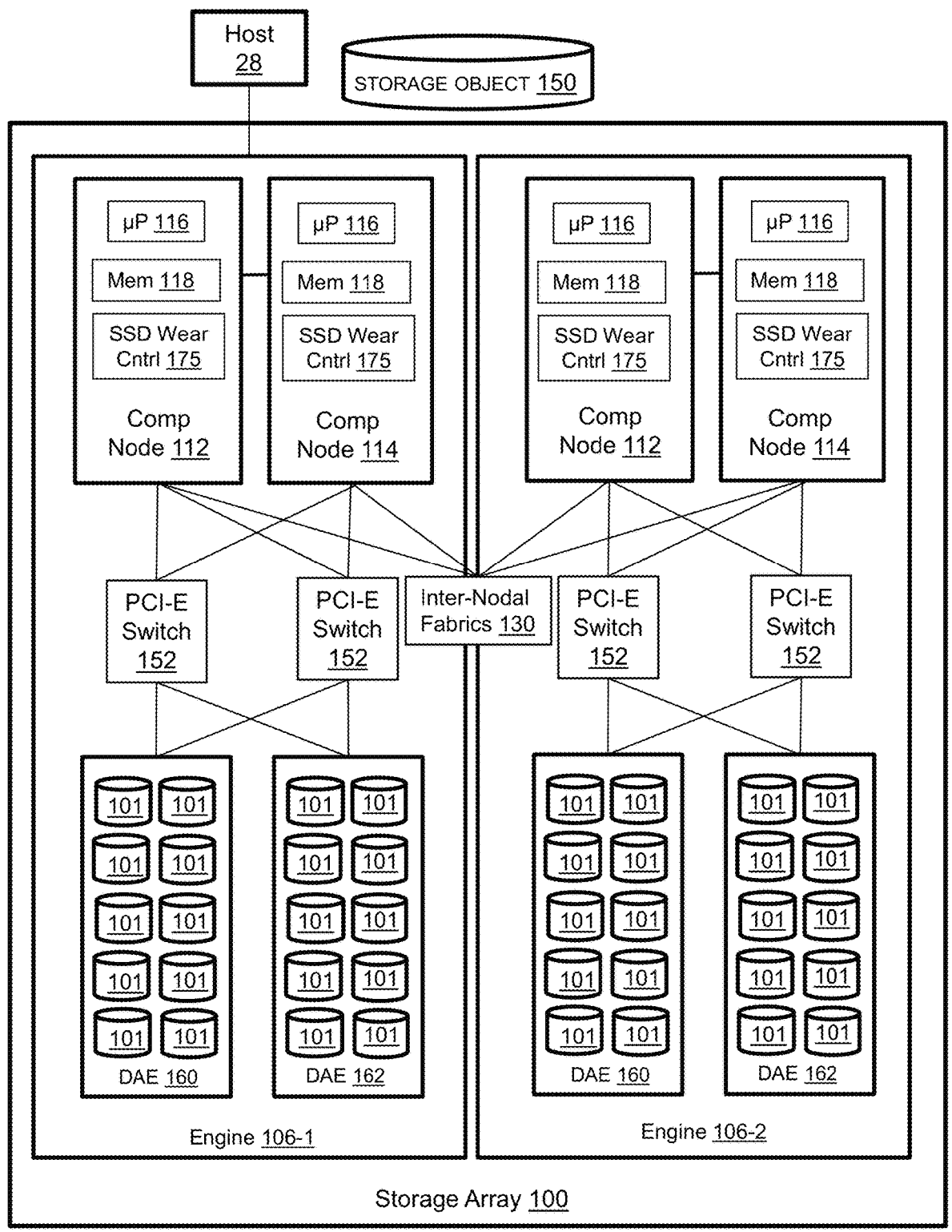
FIG. 1 illustrates a storage system in which SSD wear control programs implement wear leveling with predictive migration of data devices in a redundant array of independent disks (RAID) container system.

FIG. 1 illustrates a storage system in which SSD wear control programs 175 implement wear leveling with predictive migration of data devices in a RAID container system. The exemplary storage system is a storage array 100 with two engines 106-1, 106-2, that might include any number of engines. Each engine includes disk array enclosures (DAEs) 160, 162 and a pair of peripheral component interconnect express (PCI-E) interconnected compute nodes 112, 114 (aka storage directors) in a failover relationship. Within each engine, the compute nodes and DAEs are interconnected via redundant PCI-E switches 152. Each DAE includes managed drives 101 that are SSDs based on nonvolatile memory express (NVMe). Each compute node is implemented as a separate printed circuit board and includes resources such as at least one multi-core processor 116 and local memory 118. The processor 116 may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory 118 to a shared memory that can be accessed by all compute nodes of the storage array. Each compute node includes one or more adapters and ports for communicating with host servers such as host 28 for servicing IOs. Each compute node also includes one or more adapters for communicating with other compute nodes via redundant inter-nodal channel-based InfiniBand fabrics 130.

Data that is created and used by instances of applications running on the host servers is maintained on the managed drives 101. The managed drives are not discoverable by the host servers, so the storage array creates a logical production storage object 150 that can be discovered and accessed by those host servers. Without limitation, a production storage object may be referred to as a source device, production device, production volume, or production LUN, where the logical unit number (LUN) is a number used to identify logical storage volumes in accordance with the small computer system interface (SCSI) protocol. From the perspective of the host servers, each production storage object is a single disk drive having a set of contiguous fixed-size logical block addresses (LBAs) on which data used by the instances of one of the host applications resides. However, the host application data is stored at non-contiguous addresses on various managed drives 101 and the storage array maintains meta-data that maps between storage object 150 and the managed drives. Wear control programs 175 implement wear leveling of the managed drives 101 as described below.

Figure 2:
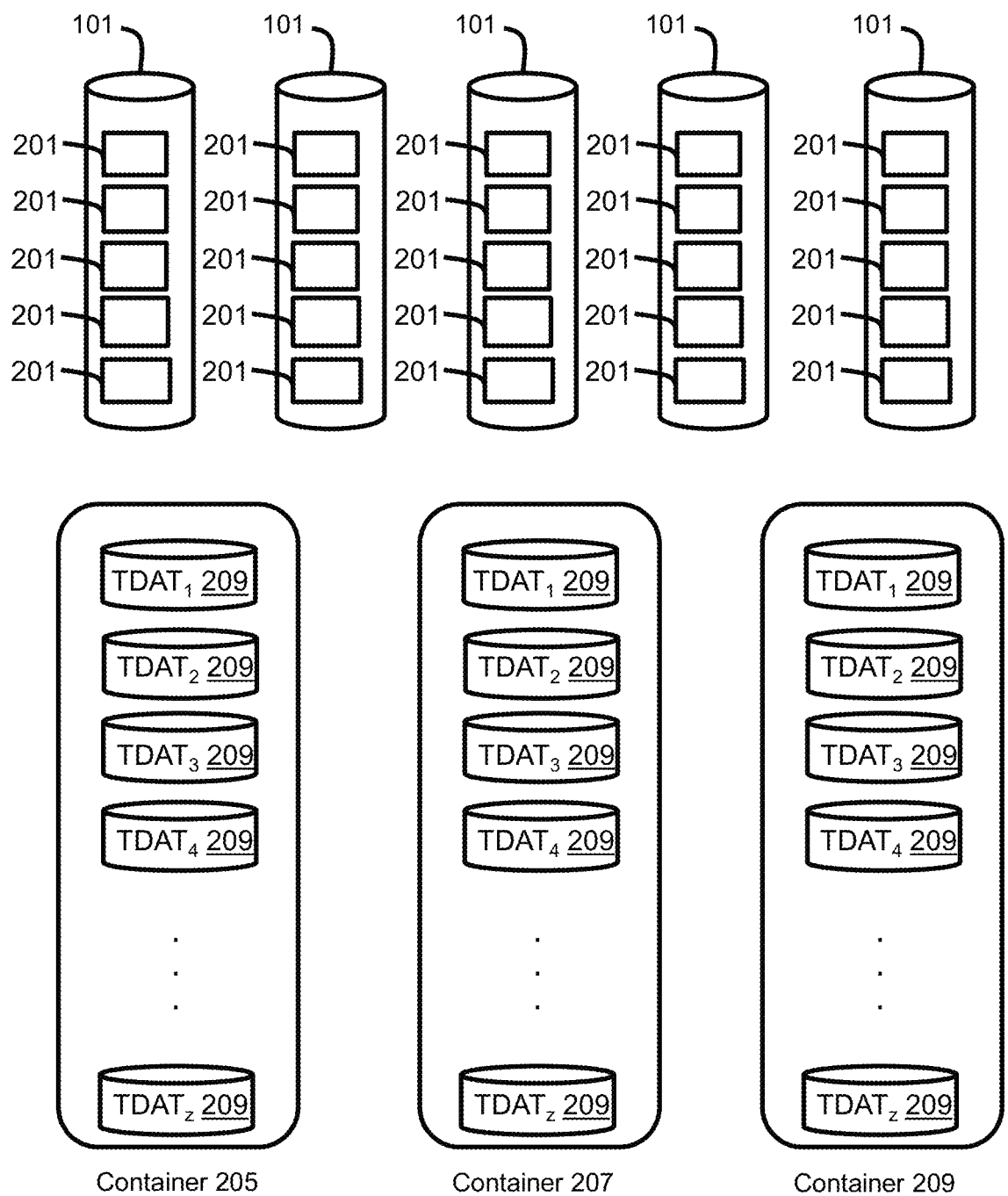

FIGS. 2, 3, and 4 illustrate the container system. The storage capacity of each of the managed drives 101 of a disk array is configured into same-size cells 201. The storage capacity of the disk array is further configured with equal size RAID containers 205, 207, 209. Each container 205, 207, 209 contains the same number of cells 201 as the RAID width W, e.g., W=5 for RAID 5 (4+1). The W cells per RAID container are distributed over W disks (managed drives 101). In the example shown in FIG. 3, the disk array has three subsets of disks (1-5, 6-10, and 11-16) corresponding to container sets {A, B, C, D, E}, {F, G, H, I, J}, and {K, L, M, N, O, P}.

Containers 205, 207, 209 are subdivided into equal size data devices (TDATs) 209 for granularity. All containers support the same number (z) of equal size data devices, TDAT1 through TDATz. The 2-level hierarchy of containers and data devices reduces RAID distribution complexity and meta-data resource consumption, as compared to managing the locations of individual RAID devices. Each data device 209 is distributed over the same set of W disks as its associated container. In general, data device I/O operations (reads and writes) may be evenly distributed over W disks due to RAID striping. Further, all disks supporting a data device may equally share its I/O loads. However, disk-level loads tend to diverge because not all data is equally accessed by the host servers, each disk may contain different data devices, and the aggregate loads of data devices per disk tends to differ accordingly.

A predetermined non-zero number of empty data devices are reserved as spare data devices for RAID failure recovery. RAID protection groupings enable a failed member to be rebuilt from the non-failed members. In addition to use for RAID failure recovery, the reserved empty storage space is made available for data migration implemented for purposes of SSD wear leveling. As will be explained below, data from a selected data device is migrated to a spare data device and the then-vacated data device is redesignated as a spare data device, so there is no change in the aggregate number of data devices reserved as spare data devices. Disks with high wear levels are identified periodically per predetermined time interval, where high wear level is predefined, e.g., using a threshold value. Some data devices with high wear-inducing loads, i.e., writes, are migrated away from the identified high-wear disks to spare data devices located on low-wear disks, thereby promoting wear leveling, where high wear-inducing loading is predefined, e.g., using a threshold value. Heuristics are used to select data device targets for data migration as will be explained below.

Figure 5:
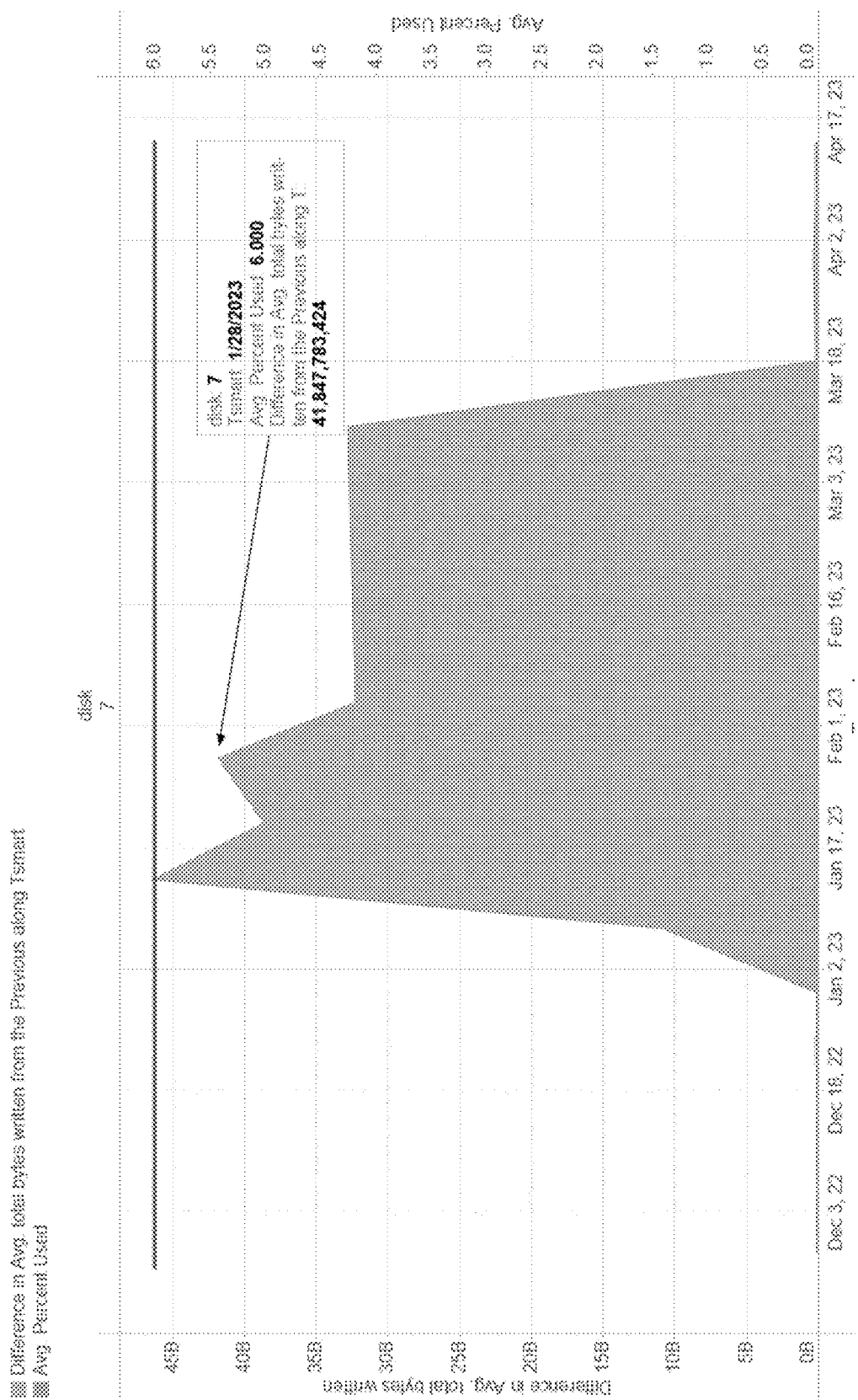
FIG. 5 illustrates disk wear-level and rate of change.

FIG. 5 illustrates disk wear-level and rate of change. When SSD wear levels are represented by % endurance in terms of P/E cycles used in a typical storage system, weeks of time may pass before a single percentage point increase is observed. However, the rate of change may vary significantly over the same time interval. For example, the average percent used of disk 7 shown in FIG. 5 does not change by more than one percentage point for months, but the rate of change derived from the difference of total bytes written to the disk over time changes as shown over the same time interval. The rate of change is therefore more useful as a predictor of wear rate.

Because SSD wear correlates with the total amount of bytes written, SSD wear rate can be predicted by a weighted sum of write rates of all data devices on the disk. One process for computing wear rate predictions is as follows.

ρ=Disk wear level (% life used)
ω=Data device total bytes written
Δ=Difference of collected (data device total bytes written)
τ=difference in time $$\Delta = \omega_t - \omega_{t-1}$$

$\gamma^{(d)}$=write rate of a data device at a certain interval where d is a data device $$Y^d = \Delta^d/\tau$$

Monitoring the values of write rate of a data device over time, a timeseries is generated:

$$\gamma^{(d)} = [\gamma_1^{(d)}, \gamma_2^{(d)}, \ldots, \gamma_N^{(d)}]$$

To predict future values for data device wear rate from a given set of inputs Y (d), time series forecasting based on Support Vector Regression (SVR) is used. SVR is a type of support vector machine that is used for regression tasks. It operates by finding a function that best predicts a continuous output value for a given input value. SVR can use both linear and non-linear kernels. A linear kernel is a simple dot product between two input vectors, while a non-linear kernel is a more complex function that can capture more intricate patterns in the data. The wear rate time-series data exhibits non-linearity, which cannot be suitably mapped by linear models. Consequently, the ability of SVM to handle non-linearity in the data for regression tasks makes SVR suitable in forecasting data device wear rate.

Disk wear rate $\psi$ is computed as a weighted sum of predicted write rates of all data devices on the disk, where $\beta$ is the weight of each data device write rate.

$$\psi = \Sigma_{d=1}^{D} \beta_d \gamma^d$$

Figure 6:
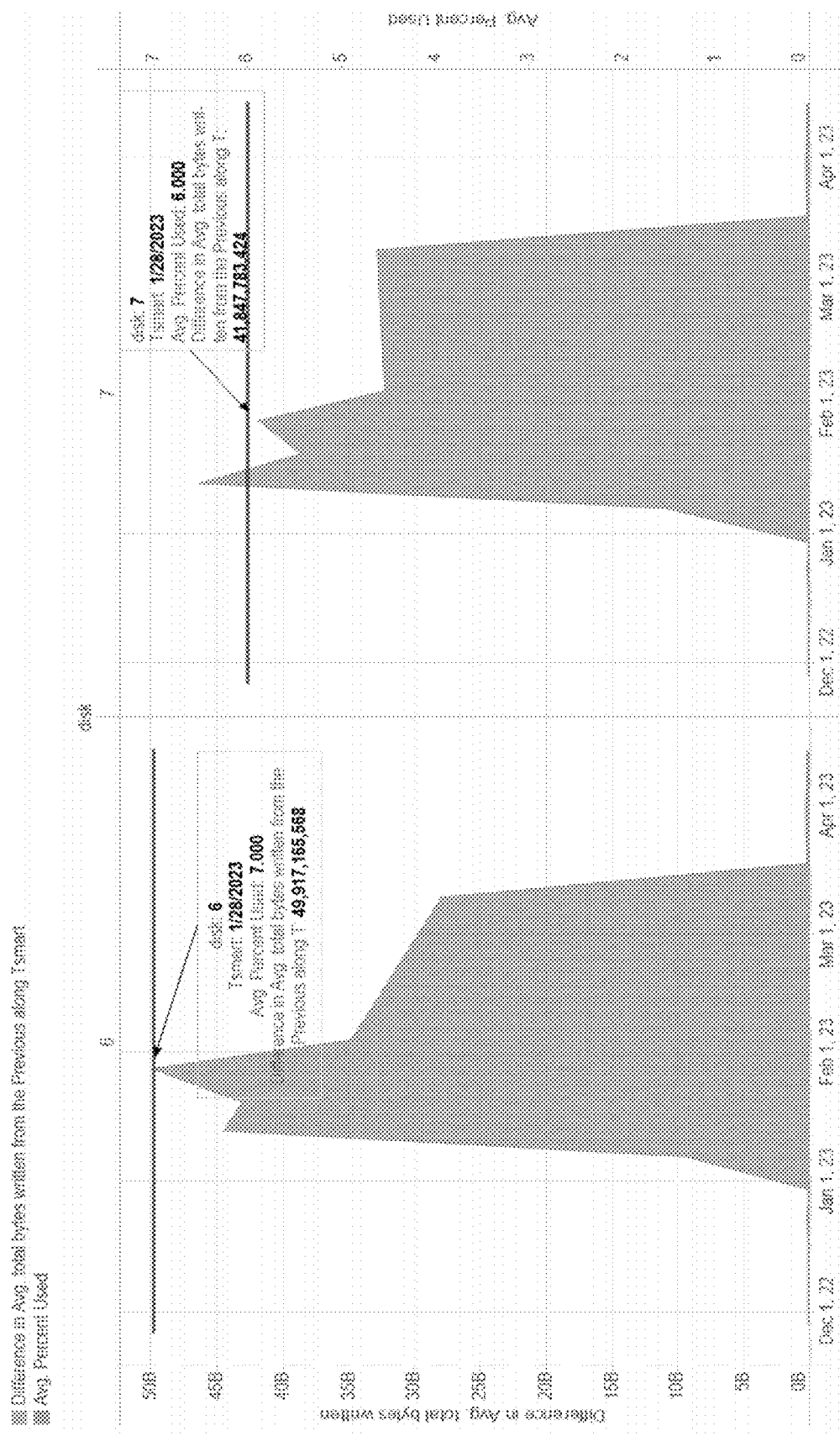
FIG. 6 illustrates weight variation.

The weight can vary over time per disk because it depends on the write amplification factor, which in turn depends on disk workloads. In FIG. 6, for example, SSD 7 and SSD 6 are in the same disk array but have different wear rates.

FIG. 7 illustrates data migration to promote SSD wear levelling. Although the wear level of a disk monotonically increases over time, the rate of increase of wear on the disk can be reduced via data migration. To reduce the wear rate of a selected disk, data devices that induce the highest wear rate on that disk are identified and migrated from that disk to low wear disks on which spare data devices are available as migration targets. For example, if drives 1-5 have high wear levels, high-wear data devices from containers (A, E) on these drives are selected for migration to spare data devices within containers (J, P) on low wear drives 6-16. As a result, future wear levels of drives 6-10 and 12-16 may increase at a higher rate, but the wear levels of drives 1-5 will increase at a lower rate. Wear leveling is achieved over time by redistributing the greatest wear-inducing data devices.

Heuristics may be used to select migration source and target data device pairs. A subset of disks (H) with high wear levels above a statistical threshold, e.g., top 5%, is identified. Let W be the subset of high-wear data devices on these disks. Let S be the subset of spare data devices with reserved space for potential data migration. Let L be the subset of disks on which these spare data devices are located. Let D be the set of spare data devices on disks within the subset (L-H), i.e., disks without high wear levels. The SSD wear control programs compute candidate plans that migrate data devices in W to spare data devices in D. Each data device in W may migrate to an available spare data device or it may not migrate at all. For example, a migration plan may be Mq={(Ax, Pz), (Ev, Jy), . . . }, where a high wear data device Ax will migrate to a spare data device Pz, and a high wear data device Ev will migrate to a spare data device Jy, etc. Another migration plan may be Mt={(Ax, Jy), (Ev, Pz), . . . } with different pairs of data device and spare data devices. For each migration plan, the predicted disk wear rate is computed from the weighted sum of all data writes on the disk, as already described above. The amount of data movement per plan is computed and incorporated into the wear rate computations because there is a tradeoff between disk wear and data movement. Moving data to new disks incurs additional writes and disk wear in addition to the original workloads in the predictive model. Consequently, the plan that produces the minimal maximum disk wear rate exclusive of the effects of migration may be undesirable to implement because of high data movement overhead.

Migration may be enhanced to include the amortized disk wear caused by data movement. For example, a migrated data device may be excluded from subsequent migration for a predetermined time interval, such that the disk wear from data movement is amortized over this time. Such temporal damping may advantageously help to avoid moving the same data devices back and forth between the same pair of containers. With such an enhancement, the plan that produces the minimal maximum predictive disk wear rate may be selected. If the size of D is less than the size of W, the selection is competitive. Only those data devices inducing highest predictive wear rates will be migrated.

In certain cases, it may be desirable to migrate low-wear data devices off of low-wear disks to free-up space for data devices that induce high wear rates. This procedure involves contingent data movement, so performance may be limited to situations in which disks are near a predefined high-wear threshold. Data movement is generally avoided when practical as a default rule.

Figure 8:
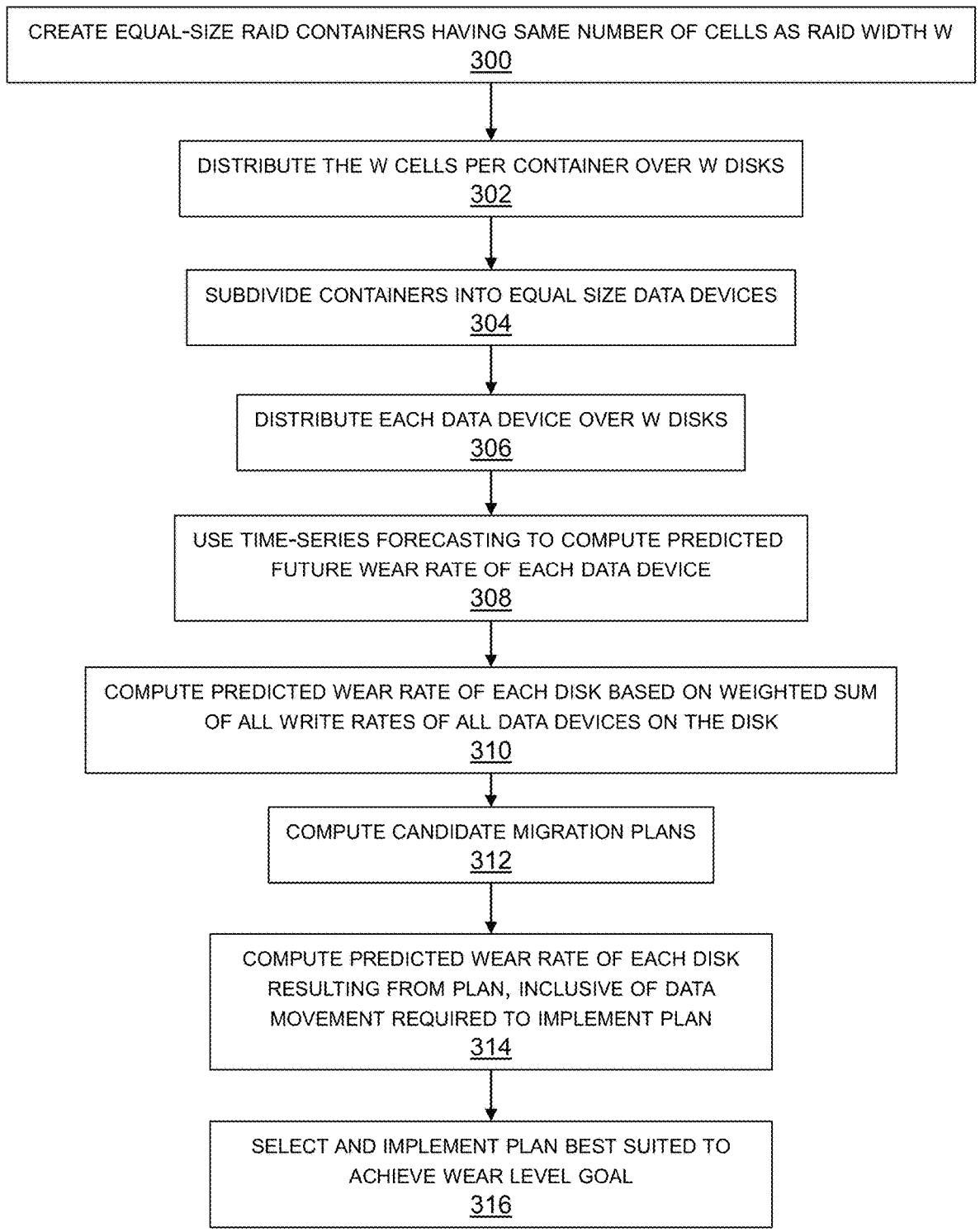
FIG. 8 illustrates a method for wear leveling with predictive migration of data devices.

FIG. 8 illustrates a method for wear leveling with predictive migration of data devices. Steps 300 through 306 are configuration steps that may be performed before the disk array is put into service. Step 300 is organizing a disk array by creating equal-size RAID containers that each have the same number of cells as the RAID width W. Step 302 is distributing the W cells per container over W disks. Step 304 is subdividing each of the containers into the same number of equal-size data devices. Step 306 is distributing each data device over W disks.

Once the disk array is configured and placed into service, wear-leveling computations are performed. Step 308 is using time-series forecasting to compute predicted future wear rates of the data devices. Step 310 is computing predicted wear rate of each of the disks as a weighted sum of all write rates of all data devices on the disk. Step 312 is computing candidate migration plans. Step 314 is computing predicted wear rate of each disk resulting from each plan, inclusive of the data movement required to implement the plan. Step 316 is selecting and implementing the plan or plans best suited to achieving the wear levelling goal. As previously described, temporal damping of migration may be implemented to help avoid moving the same data devices back and forth between the same pair of containers.

A number of features, aspects, embodiments, and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. A method comprising:
configuring storage capacity of an array of solid-state drives (SSDs) by:
creating equal-size redundant array of independent disk (RAID) containers that each have W same-size cells corresponding to a RAID width W;
distributing the W cells per container over a set of W SSDs;
subdividing each of the containers into a number of equal-size data devices that are logical disk drives with a non-zero number of empty data devices reserved as spare storage capacity for RAID failure recovery, all the containers configured to support the same number of the equal-size data devices, each data device being distributed over the same set of W SSDs as its container; and
distributing each data device over W SSDs; and
computing and implementing SSD wear leveling for each of the SSDs by:
computing predicted future wear rates of each of the data devices on that SSD based on predicted write rates using time-series forecasting based on Support Vector Regression (SVR);
computing candidate migration plans that migrate data devices in a subset of high-wear rate data devices on SSDs with high wear levels above a statistical wear level threshold to spare data devices in a set of spare data devices on SSDs without high wear levels;
for each of the candidate migration plans, computing predicted SSD wear rate from a weighted sum of all data writes on the SSD;
computing predicted wear rate of each SSD for each of the candidate migration plans inclusive of data movement required to implement the respective candidate migration plan;
selecting the candidate migration plan that produces a minimal maximum SSD wear rate inclusive of data movement required to implement the candidate migration plan; and
migrating data from high-wear rate data devices on high-wear level SSDs to empty data devices on SSDs that are not high-wear level according to the selected candidate migration plan.

2. The method of claim 1 further comprising computing a predicted wear rate of each of the SSDs, where wear rates increase and decrease and indicate change in wear level over time.

3. The method of claim 2 further comprising computing the predicted wear rate of each of the SSDs as a weighted sum of all write rates of all data devices on the SSD.

4. The method of claim 3 further comprising performing computations using non-linear kernel SVR.

5. The method of claim 3 further comprising computing heuristic candidate migration plans for pairings of high-wear rate data devices on high-wear level SSDs and empty data devices on SSDs that are not high-wear level.

6. The method of claim 5 further comprising excluding migrated data device data from being migrated again for a predetermined time period.

7. An apparatus comprising:
a data storage node in which storage capacity of an array of solid-state drives (SSDs) is characterized by equal-size redundant array of independent disk (RAID) containers that each have W same-size cells corresponding to a RAID width W, the W cells per container distributed over a set of W SSDs, each of the containers subdivided into a number of equal-size data devices that are logical disk drives with a non-zero number of empty data devices reserved as spare storage capacity for RAID failure recovery, and each data device distributed over W SSDs, all the containers configured to support the same number of the equal-size data devices, each data device being distributed over the same set of W SSDs as its container; and
an SSD wear control program configured to compute and implement SSD wear leveling for each of the SSDs by:
computing predicted future wear rates of each of the data devices on that SSD based on predicted write rates using time-series forecasting based on Support Vector Regression (SVR);
computing candidate migration plans that migrate data devices in a subset of high-wear rate data devices on SSDs with high wear levels above a statistical wear level threshold to spare data devices in a set of spare data devices on SSDs without high wear levels;
for each of the candidate migration plans, computing predicted SSD wear rate from a weighted sum of all data writes on the SSD;
computing predicted wear rate of each SSD for each of the candidate migration plans inclusive of data movement required to implement the respective candidate migration plan;
selecting the candidate migration plan that produces a minimal maximum SSD wear rate inclusive of data movement required to implement the candidate migration plan; and
causing data to migrate from high-wear rate data devices on high-wear level SSDs to empty data devices on SSDs that are not high-wear level according to the selected candidate migration plan.

8. The apparatus of claim 7 further comprising the wear control program configured to compute a predicted wear rate of each of the SSDs, where wear rates increase and decrease and indicate change in wear level over time.

9. The apparatus of claim 8 further comprising the wear control program configured to compute the predicted wear rate of each of the SSDs as a weighted sum of all write rates of all data devices on the SSD.

10. The apparatus of claim 9 further comprising the wear control program configured to compute predicted wear rates using non-linear kernel SVR.

11. The apparatus of claim 9 further comprising the wear control program configured to compute heuristic candidate migration plans for pairings of high-wear rate data devices on high-wear level SSDs and empty data devices on SSDs that are not high-wear level.

12. The apparatus of claim 11 further comprising the wear control program configured to exclude migrated data device data from being migrated again for a predetermined time period.

13. A non-transitory computer-readable storage medium stores instructions that when executed by one or more computers cause the computers to perform a method comprising:
configuring storage capacity of an array of solid-state drives (SSDs) by:
creating equal-size redundant array of independent disk (RAID) containers that each have W same-size cells corresponding to a RAID width W;

distributing the W cells per container over a set of W SSDs;

subdividing each of the containers into a number of equal-size data devices that are logical disk drives with a non-zero number of empty data devices reserved as spare storage capacity for RAID failure recovery, all the containers configured to support the same number of the equal-size data devices, each data device being distributed over the same set of W SSDs as its container; and distributing each data device over W SSDs; and computing and implementing SSD wear leveling for each of the SSDs by:

computing predicted future wear rates of each of the data devices on that SSD based on predicted write rates using time-series forecasting based on Support Vector Regression (SVR);

computing candidate migration plans that migrate data devices in a subset of high-wear rate data devices on SSDs with high wear levels above a statistical wear level threshold to spare data devices in a set of spare data devices on SSDs without high wear levels;

for each of the candidate migration plans, computing predicted SSD wear rate from a weighted sum of all data writes on the SSD;

computing predicted wear rate of each SSD for each of the candidate migration plans inclusive of data movement required to implement the respective candidate migration plan;

selecting the candidate migration plan that produces a minimal maximum SSD wear rate inclusive of data movement required to implement the candidate migration plan; and migrating data from high-wear rate data devices on high-wear level SSDs to empty data devices on SSDs that are not high-wear level according to the selected candidate migration plan.

14. The non-transitory computer-readable storage medium of claim 13 in which the method further comprises computing a predicted wear rate of each of the SSDs, where wear rates increase and decrease and indicate change in wear level over time.

15. The non-transitory computer-readable storage medium of claim 14 in which the method further comprises computing the predicted wear rate of each of the SSDs as a weighted sum of all write rates of all data devices on the SSD.

16. The non-transitory computer-readable storage medium of claim 15 in which the method further comprises performing computations using non-linear kernel SVR.

17. The non-transitory computer-readable storage medium of claim 15 in which the method further comprises computing heuristic candidate migration plans for pairings of high-wear rate data devices on high-wear level SSDs and empty data devices on SSDs that are not high-wear level.

* * * * *